United States Patent [19]

Inada

[11] Patent Number: 5,485,310
[45] Date of Patent: Jan. 16, 1996

[54] LINEAR POLARIZATION/CONVERSION APPARATUS

[75] Inventor: Tomohide Inada, Tokyo, Japan

[73] Assignee: Nippon Avionics Co., Ltd., Tokyo, Japan

[21] Appl. No.: 352,430

[22] Filed: Dec. 8, 1994

Related U.S. Application Data

[63] Continuation of Ser. No. 983,671, Dec. 1, 1992, abandoned.

[30] Foreign Application Priority Data

Dec. 2, 1991 [JP] Japan ..................... 3-341792

[51] Int. Cl.$^6$ .............................. G02B 5/30; G02B 27/28
[52] U.S. Cl. ........................ 359/495; 359/494; 359/629; 353/82
[58] Field of Search ................... 359/485, 494, 359/495, 496, 629, 634; 353/82

[56] References Cited

U.S. PATENT DOCUMENTS

| | | | |
|---|---|---|---|
| 3,508,809 | 4/1970 | Wilder et al. | 359/495 |
| 3,677,621 | 7/1972 | Smith | 359/495 |
| 4,722,593 | 2/1988 | Shimazaki . | |
| 4,904,061 | 2/1990 | Aruga . | |
| 4,963,003 | 10/1990 | Hiiro | 359/495 |
| 4,978,202 | 12/1990 | Yang . | |
| 5,073,830 | 12/1991 | Loucks | 359/495 |
| 5,124,841 | 6/1992 | Oishi | 359/495 |

FOREIGN PATENT DOCUMENTS

| | | | |
|---|---|---|---|
| 0456427 | 11/1991 | European Pat. Off. | 359/495 |
| 2064613 | 5/1990 | Japan . | |
| 2039084 | 8/1990 | Japan . | |

*Primary Examiner*—Ricky D. Shafer
*Attorney, Agent, or Firm*—Blakely, Sokoloff, Taylor & Zafman

[57] ABSTRACT

A linear polarization/conversion apparatus includes a light source, a polarizing beam splitting means, first and second focusing lenses, and first to fourth total reflection mirrors. The light source includes a reflector having a paraboloid of revolution. The polarizing beam splitting means splits light from the light source into a linearly polarized transmission light component and a linearly polarized reflection light component. The first and second focusing lenses are respectively disposed to oppose exit surfaces, of the polarizing beam splitting means, from which the linearly polarized transmission and reflection light components emerge. The first and second total reflection mirrors are inclined at 45° with respect to the exit surfaces, respectively, so as to totally reflect the linearly polarized transmission and reflection light components from the first and second focusing lenses. The third and fourth total reflection mirrors are respectively inclined at 45° with respect to the reflection optical axes of the first and second total reflection mirrors to totally reflect the light, reflected by the first and second total reflection mirrors, in the same direction.

10 Claims, 3 Drawing Sheets

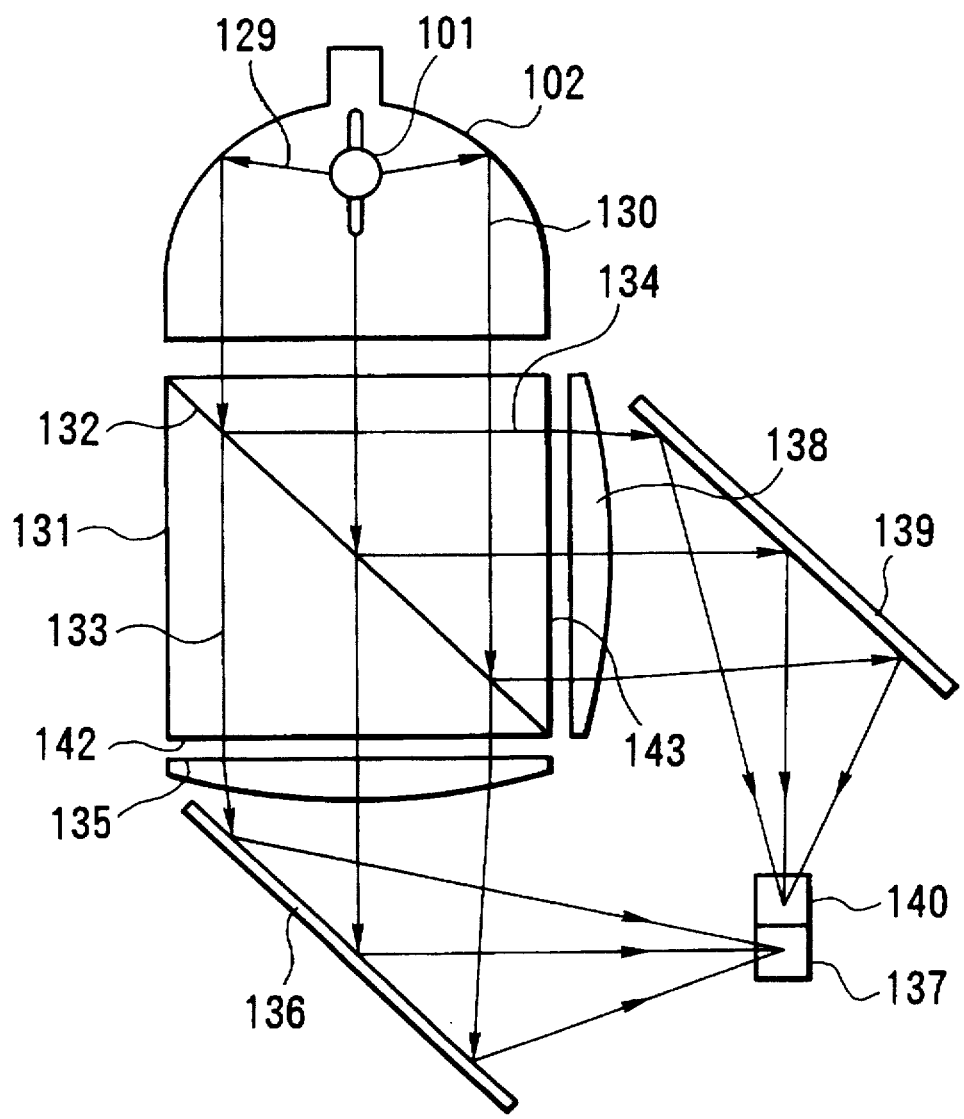
F I G. 2
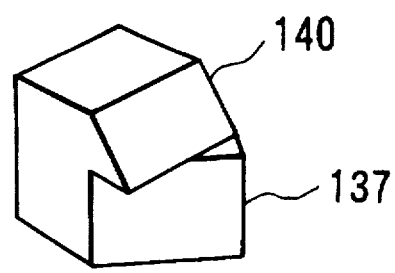
F I G. 3

LINEAR POLARIZATION/CONVERSION APPARATUS

This is a continuation of application Ser. No. 07/983,671 filed Dec. 1, 1992, now abandoned.

BACKGROUND OF THE INVENTION

The present invention relates to a linear polarization/conversion apparatus suitably applied to a projection type color liquid crystal display for adding/mixing display images obtained by monochrome liquid crystal panels respectively arranged for red (R), green (G), and blue (B), and projecting a resultant color image.

With a growing trend toward larger television screens, a great deal of attention has recently been paid to a projection type liquid crystal display, which is designed to enlarge/project an image, displayed on a liquid crystal TV panel, on its screen, for it is small, light, and easy to handle. However, in comparison with image projection type CRT (cathode-ray tube) displays, which constitute the mainstream of projection type displays and have achieved a high degree of perfection, projection type liquid crystal displays are still unsatisfactory in terms of both resolution and brightness. That is, there is much room for improvement in projection type liquid crystal displays.

In order to increase the resolution, a high-definition liquid crystal TV panel is being developed. With regard to the brightness, it is assumed that a projection type liquid crystal display is superior to a projection type CRT display because it allows separation of an image formation portion from a light source. However, the brightness of a projection type liquid crystal display is still about ½ to ⅓ that of a standard CRT display. The quickest way to increase the intensity of projection light is to use a high-output lamp. This method, however, is not practical because degradation of the components of a display is caused by an increase in power consumption and apparatus temperature.

FIG. 4 shows a conventional projection type color liquid crystal display called a mirror scheme display using dichroic mirrors for color separation and mixing of light. Referring to FIG. 4, reference numeral 1 denotes a light source such as a xenon lamp. Light emitted from the light source 1 is reflected by a reflecting mirror 2 having a parabolic reflection surface and designed to convert source light into light parallel to the optical axis. The light is then converged toward a projection optical system 19 by condenser lenses (not shown) respectively arranged in front of liquid crystal panels 7, 12, and 15. At this time, the convergent parallel light is incident on a blue dichroic mirror 4 for splitting/reflecting only a blue light component. A blue light component 5 split by the blue dichroic mirror 4 is reflected by a mirror 6 in a direction parallel to the optical axis of the light source 1 and is incident on the transmission type liquid crystal panel 7. A voltage is selectively applied to the liquid crystal panel 7 in accordance with the constituent pixels of an arbitrary image to be projected. The blue light component 5 transmitted through the liquid crystal panel 7 is converted into a blue image light component 5a having an image signal.

The light, transmitted through the blue dichroic mirror 4, from which the blue light component 5 is lost, becomes a yellow light component 8. The yellow light component 8 is incident on a red dichroic mirror 9. As a result, a red light component 10 is split from the yellow light component 8. A remaining green light component 11 is transmitted through the mirror 9. The split red light component 10 is incident on the transmission type liquid crystal panel 12 having the same arrangement as that of the liquid crystal panel 7 so as to be converted into a red image light component 10a. The blue and red image light components 5a and 10a are mixed together by a mixing dichroic mirror 13 to generate a magenta image light component 14.

Meanwhile, the green light component 11 is incident on the transmission type liquid crystal panel 15 having the same arrangement as that of the liquid crystal panel 7 to be converted into a green image light component 11a. The green image light component 11a is then reflected by a mirror 16 to be incident on a mixing dichromic mirror 17. The green image light component 11a and the magenta image light component 14 are mixed together by the mixing dichromic mirror 17 to generate RGB added/mixed image light 18. The image light 18 is then enlarged/projected on a large screen 20 through a projection optical system 19, thus reproducing a color image.

FIG. 5 shows the actual arrangement (omitted in FIG. 4) of the transmission type liquid crystal panel 7 (identical to the liquid crystal panels 12 and 15). The liquid crystal panel 7 has two polarizing plates 21A and 21B arranged on both sides thereof. Such an arrangement is employed because the liquid crystal (twisted nematic liquid crystal) used for the liquid crystal panel 7 is designed to rotate the plane of polarization of incident light rather than to transmit or block light in accordance with the applied state of a voltage. More specifically, if natural light, which is polarized in random directions, is incident on a liquid crystal panel, natural light emerges from the panel regardless of the state of an applied voltage. Even if, therefore, an image is formed on the liquid crystal panel, the image cannot be recognized. For this reason, the polarizing plate 21A is disposed in front of the liquid crystal panel 7 to transmit only light components, of the natural light, which are polarized in a predetermined direction, thereby converting the natural light into linearly polarized light components. That is, when the natural light is transmitted through the polarizing plate 21A, the light is split into two linearly polarized light components orthogonal to each other. Of these light components, the light component parallel to the direction of polarization is transmitted through the polarizing plate 21A, while the light component perpendicular to the direction of polarization is absorbed. When the linearly polarized light component parallel to the direction of polarization is incident on the liquid crystal panel 7, the direction of polarization is partially rotated in accordance with an image, and the resultant light emerges from the liquid crystal panel 7. When only the light component polarized in a predetermined direction is transmitted through the polarizing plate 21B, a gradation image is obtained for the first time. Note that when the light component perpendicular to the direction of polarization is absorbed by the polarizing plate 21A, it is converted into heat.

As is apparent from the above description, in the conventional apparatus, since at least half of natural light is absorbed by the polarizing plate 21A in the process of extracting the linearly polarized light components from the natural light through the polarizing plate 21A, a problem is posed in terms of effective use of light. In addition, since the absorbed light is converted into heat to raise the temperature of the polarizing plate 21A, degradation of the polarizing plate 21A poses an additional problem. Under the circumstances, demands have arisen for the development of an apparatus which can convert all the light emitted from a light source into light components polarized in a predetermined direction, rather than extract a light component polarized in a predetermined direction through the polarizing plate 21A, thereby solving the above problems, i.e., an increase in light amount and degradation of a polarizing plate due to heat.

Note that the problem of degradation of the second polarizing plate 21B is not so serious as that of the first polarizing plate 21A, because the opening portion of the liquid crystal panel 7 is about 40% of all the area (an increase in opening degree is an important factor in terms of an increase in the brightness of a projection type color liquid crystal display).

SUMMARY OF THE INVENTION

It is an object of the present invention to provide a linear polarization/conversion apparatus which can increase the amount of light without loss of light.

It is another object of the present invention to provide a linear polarization/conversion apparatus which can solve the problem of degradation of a polarizing plate due to heat.

In order to achieve the above objects, according to the present invention, there is provided a linear polarization/conversion apparatus comprising light source means including a reflector having a paraboloid of revolution, polarizing beam splitting means for splitting substantially parallel light from the light source means into a linearly polarized transmission light component and a linearly polarized reflection light component, first converging means disposed to oppose an exit surface, of the polarizing beam splitting means, from which the linearly polarized transmission light component emerges, second converging means disposed to oppose an exit surface, of the polarizing beam splitting means, from which the linearly polarized reflection light component emerges, first total reflection means, inclined at 45° with respect to the exit surface, of the polarizing beam splitting means, from which the linearly polarized transmission light component emerges, for totally reflecting the linearly polarized transmission light component from the first converging means, second total reflection means, inclined at 45° with respect to the exit surface, of the polarizing beam splitting means, from which the linearly polarized reflection light component emerges, for totally reflecting the linearly polarized reflection light component from the second converging means, third total reflection means, inclined at 45° with respect to a reflection optical axis of the first total reflection means, for totally reflecting the light reflected by the first total reflection means, and fourth total reflection means, inclined at 45° with respect to a reflection optical axis of the second total reflection means, for totally reflecting the light, reflected by the second total reflection means, in the same direction as that of the light reflected by the third total reflection means.

BRIEF DESCRIPTION OF THE DRAWINGS

FIG. 2 is a side view in the direction of a line A—A in FIG. 1;

FIG. 3 is a perspective view showing a mirror block as a third and fourth total reflection mirrors;

DESCRIPTION OF THE PREFERRED EMBODIMENT

An embodiment of the present invention will be described in detail below with reference to the accompanying drawings.

Figure 1:
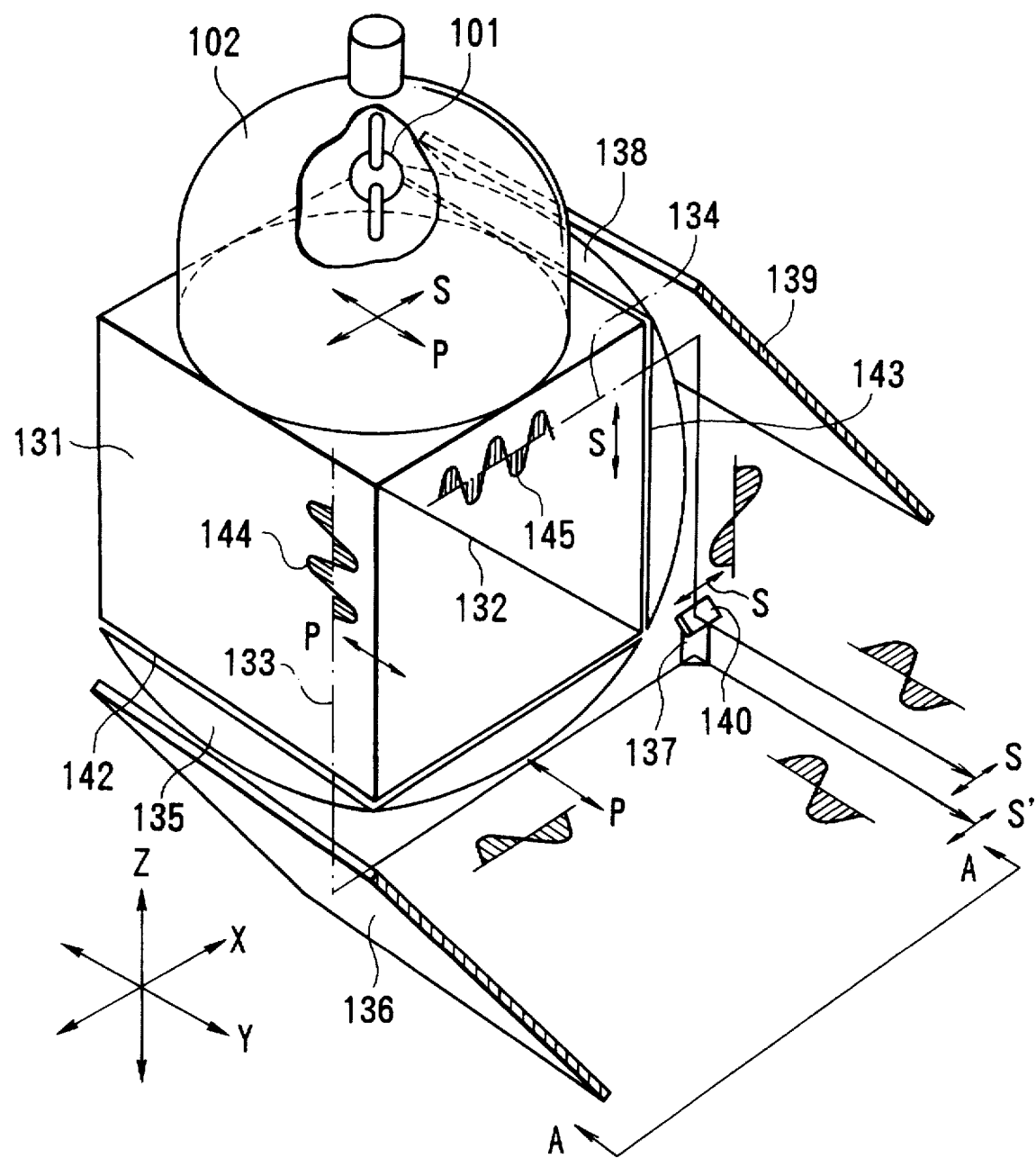
FIG. 1 is a perspective view showing a linear polarization/conversion apparatus according to an embodiment of the present invention.
Figure 4:
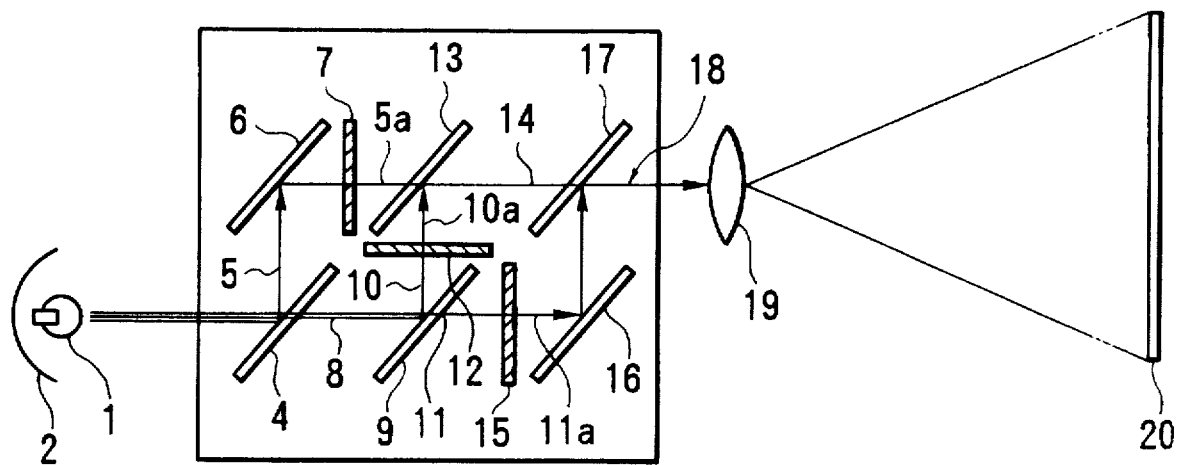
FIG. 4 is a view showing a conventional projection type color liquid crystal display.
Figure 5:
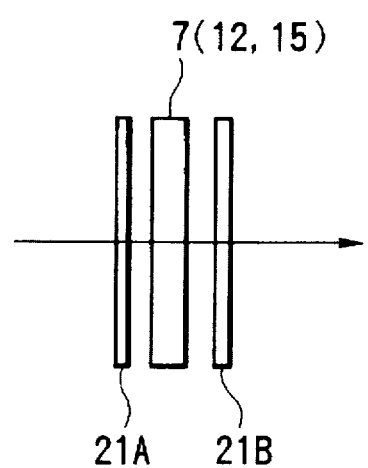
FIG. 5 is a view showing the arrangement of a liquid crystal panel and polarizing plates.

FIGS. 1 and 2 show a linear polarization/conversion apparatus according to the embodiment of the present invention. FIG. 3 shows a mirror block as a third and fourth total reflection mirrors. Referring to FIGS. 1 to 3, in this embodiment, natural light 129 emitted from a light source 101 is converted into light 130 parallel to the optical axis by a reflector 102 having an inner surface constituted by a paraboloid of revolution. When the light 130 is incident on a polarizing beam splitting means 131, the light is split into a linearly polarized transmission light component (to be referred to as a P-polarized wave hereinafter) 133 and a linearly polarized reflection light component (to be referred to as an S-polarized wave hereinafter) 134. The P-polarized wave 133 is converged by a focusing lens (converging means) 135 and is totally reflected by a first total reflection mirror 136 in a direction perpendicular to the optical axis of the light source 101. Meanwhile, the S-polarized wave 134 is converged by a focusing lens 138 and is totally reflected by a second total reflection mirror 139 in a direction parallel to the optical axis of the light source 101. The P-polarized wave 133 is farther totally reflected by a third total reflection mirror 137 by 90° with in the same plane. The S-polarized wave 134 is further totally reflected by a fourth total reflection mirror 140 in the same direction as that of the P-polarized wave 133. With this operation, the resultant light is converted into parallel light through a convergence lens (not shown) while the optical axes of the P- and S-polarized waves 133 and 134 are set to be close to each other. The parallel light is then guided to the liquid crystal panel 7 shown in FIG. 4. In this case, the liquid crystal panel 7 does not require at least the polarizing plate 21A shown in FIG. 5.

The polarizing beam splitting means 131 is designed such that a dielectric multilayered film 132 is deposited on the inclined surface of one of two rectangular prisms, and the inclined surfaces of the two prisms are bonded to each other. The polarizing beam splitting means 131 can split the light 130 into two linearly polarized light components which are polarized in two orthogonal directions. The light component transmitted through the inclined surface of the polarizing beam splitting means 131 is the P-polarized wave 133, whereas the light reflected by the inclined surface is the S-polarized wave 134. Immediately after the beam splitting operation, the P-polarized wave 133 is a linearly polarized light component having a component vibrating in a direction perpendicular to the propagating direction in FIG. 1, with its plane of vibration being parallel to the Y-Z plane, whereas the S-polarized wave 134 is a linearly polarized light component having a component vibrating in the Z direction in FIG. 1, with its plane of vibration being parallel to the X-Z plane and perpendicular to the plane of vibration of the P-polarized wave 133.

The focusing lenses 135 and 138 are disposed to be opposite and parallel to exit surfaces 142 and 143, of the polarizing beam splitting means 131, from which the P- and S-polarized waves 133 and 134 respectively emerge, wherein exit surface 142 is parallel to the incident surface of the P-polarized wave 133 and exit surface 143 is parallel to the incident surface of S-polarized wave 134 reflected at right angle to the dielectric multilayered film 132. The first and second total reflection mirrors 136 and 139 are inclined at 45° with respect to the exit surfaces 142 and 143, respectively, and are disposed to oppose each other. That is, the reflection surfaces of the two mirrors 136 and 139 are parallel to each other. The reflection surface of the third total reflection mirror 137 is inclined at 45° with respect to the reflection optical axis of the first total reflection mirror 136 and is perpendicular to the exit surface 142. The reflection surface of the fourth total reflection mirror 140 is inclined at 45° with respect to the reflection optical axis of the second total reflection mirror 139 and is also inclined at 45° with respect to the exit surface 143 and the third total reflection mirror 137. The third and fourth total reflection mirrors 137 and 140 are integrated into a mirror block, as shown in FIG. 3, and are disposed at the focal points of the focusing lenses 135 and 138, respectively. Note that if the total reflection mirrors 137 and 140 are disposed at the focal points of the focusing lenses 135 and 140, a large amount of heat may be generated by focused light to degrade the total reflection mirrors 137 and 140. In such a case, the mirrors 137 and 140 may be disposed at positions slightly shifted from the focal positions. Note that the optical path lengths from the light source 101 to the third and fourth total reflection mirrors 137 and 140 are set to be the same. Reference numerals 144 and 145 denote the waveforms of the P- and S-polarized waves 133 and 134. More specifically, the waveform designated by reference numeral 144 has a component which vibrates in a direction perpendicular to the direction of movement and shows typically a linearly P-polarized wave 133 whose plane of vibration is parallel to the Y direction, and the waveform designated by reference numeral 145 has a component which vibrates in the Z direction and shows typically a linearly S-polarized wave 134 whose plane of vibration is parallel to the X direction.

With this arrangement, the P-polarized wave 133 transmitted through the polarizing beam splitting means 131 has a plane of vibration parallel to the Y-Z plane, as described above. When the P-polarized wave 133 is reflected by the first total reflection mirror 136 in the direction perpendicular to the optical axis of the light source 101, the propagating direction of the P-polarized wave 133 is changed by 90° and becomes parallel to the X direction, and the plane of vibration is rotated through 90° to become parallel to the X-Y plane. As a result, the P-polarized wave 133 becomes a linearly polarized light component perpendicular to the Z direction. When the propagating direction of the this light component is further changed by means of the third total reflection mirror 137 by 90° within the same plane (X-Y plane), the light component is converted into a linearly polarized light component (S'-polarized wave) whose propagating direction is parallel to the Y direction with the plane of vibration remaining the same plane (X-Y plane). Meanwhile, the S-polarized wave 134 reflected by the dielectric multilayered film 132 of the polarizing beam splitting means 131 has a plane of vibration which vibrates in the X-Y plane and is parallel to the X direction. When the S-polarized wave 134 is reflected by the first total reflection mirror 139 in the direction parallel to the optical axis of the light source 101, the propagating direction is changed by 90° to become parallel to the Z direction, while the plane of vibration remains the same plane (X-Z plane). When the S-polarized wave 134 is further reflected by the fourth total reflection mirror 140 in the direction perpendicular to the optical axis of the light source 101, the propagating direction becomes the same as that of the P-polarized wave 133 (Y direction), and the plane of vibration becomes perpendicular to the Z direction. That is, the resultant light component is a linearly polarized light component (S-polarized wave) having the same plane of vibration as that of the P-polarized wave 133, and is totally reflected in the same direction as that of the P-polarized wave 133 while the axes of the two waves are set to be close to each other. In addition, since the optical path lengths from the light source 101 to the third and fourth total reflection mirrors 137 and 140 are set to be the same, the P- and S-polarized waves 133 and 134 have the same phase.

Therefore, all the natural light 129 emitted from the light source 101 can be extracted as linearly polarized reflection light components (S-polarized wave+S'-polarized wave) without loss, and hence the amount of polarized light incident on the liquid crystal panel 7 can be increased about twice that of the conventional apparatus. Since the polarizing plate 21A is not required, unlike the conventional apparatus, the problem of degradation of the polarizing plate due to heat can be solved.

As has been described above, according to the linear polarization/conversion apparatus of the present invention, in the process of extracting linearly polarized light components from natural light, two linearly polarized light components having different planes of vibrations are synthesized with each other in such a manner that the planes of vibration are rotated to coincide with each other by using the polarizing beam splitting means, the converging means, and the total reflection means. Therefore, all the natural light can be converted into light components polarized in a predetermined direction without using a polarizing plate. As a result, the amount of light can be increased without loss. In addition, the conventional problem of degradation of a polarizing plate can be solved, which is caused when the temperature of the polarizing plate is increased upon absorption of light.

What is claimed is:

1. A linear polarization/conversion apparatus comprising:
   light source means, including a reflector having a paraboloid of revolution, for emitting a white natural light to project an image;
   polarizing beam splitting means for splitting substantially parallel light from said source means into a linearly polarized transmission light component and a linearly polarized reflection light component which are polarized in orthogonal directions, through a beam splitting surface which is inclined at 45 degrees with respect to an optical axis of said light source;
   first converging means, disposed to oppose an exit surface of said polarizing beams splitting means from which the linearly polarized transmission light component emerges, for converging the linearly polarized transmission light component from said polarizing beam splitting means;
   second converging means, disposed to oppose an exit surface of said polarizing beam splitting means from which the linearly polarized reflection light component emerges, for converging the linearly polarized reflection light component from said polarizing beam splitting means;
   first total reflection means, disposed parallel to the beam splitting surface of said polarizing beam splitting means, for totally reflecting the linearly polarized transmission light component from said first converging means in a direction perpendicular to the optical axis of said light source;
   second total reflecting means, disposed parallel to the beam splitting surface of said polarizing beam splitting means, for totally reflecting the linearly polarized reflection light component from said second converging means in a direction parallel to the optical axis of said light source, a reflection optical axis of said first and second total reflection means crossing in an approximately orthogonal form on one plane;

third total reflection means, inclined at 45 degrees with respect to a reflection optical axis of said first total reflection means, for totally reflecting the light from said first total reflection means in parallel to surfaces of said first and second total reflection means; and fourth total reflection means, inclined at 45 degrees with respect to a reflection optical axis of said second total reflection means, for totally reflecting the light from said second total reflection means in parallel to surfaces of said first and second total reflection means, in the same direction as that of the light reflected by said third total reflection means, wherein said third and fourth reflection means are disposed to come close to each other at positions near focal points of said first and second converging means, in order to make the axes of the polarized reflection light components from said third and fourth total reflection means come close to each other.

2. An apparatus according to claim 1, wherein said polarizing beam splitting means comprises two rectangular prisms whose inclined surface are bonded, the inclined surface having a dielectric multilayered film deposited thereon and constituting the beam splitting surface.

3. An apparatus according to claim 1, wherein said first and second converging means comprise focusing lenses, respectively.

4. An apparatus according to claim 1, wherein said first to fourth total reflection means comprise total reflection mirrors, respectively.

5. An apparatus according to claim 1, wherein said third and fourth total reflection means are integrated into a total reflection block which is arranged at a cross point of the reflection optical axis of said third and fourth total reflection means.

6. An apparatus according to claim 1, wherein said second total reflection means converts a polarizing direction of the linearly polarized reflection light component from said second converging means, and said third total reflection means converts a polarizing direction of the linearly polarized reflection light component from said first total reflection means in the same polarizing direction of the linearly polarized reflection light component from said fourth total reflection means.

7. An apparatus according to claim 1, wherein an optical path lengths from said light source means to said third and fourth total reflection means are set to be the same so as to become the same phase for the linearly polarized reflection light components from said third and fourth total reflection means.

8. An apparatus according to claim 1, wherein said first total reflection means is arranged to be inclined at 45° with respect to a transmission optical axis of said polarizing beam splitting means at an exit surface side of said first converging means, and said second total reflection means is arranged to be inclined at 45° with respect to a reflection optical axis of said polarizing beam splitting means at an exit surface side of said second converging means.

9. A linear polarization/conversion apparatus comprising:

light source means, including a reflector having a paraboloid of revolution, for emitting a white natural light to project an image;

polarizing beam splitting means for splitting substantially parallel light from said light source means into a linearly polarized transmission light component and a linearly polarized reflection light component which are polarized in orthogonal directions, through a beam splitting surface which is inclined at 45 degrees with respect to an optical axis of said light source;

first total reflection means, disposed parallel to the beam splitting surface of said polarizing beam splitting means, for totally reflecting the linearly polarized transmission light component from said polarizing beam splitting means in a direction perpendicular to the optical axis of said light source;

second total reflecting means, disposed parallel to the beam splitting surface of said polarizing beam splitting means, for totally reflecting the linearly polarized reflection light component from said polarizing beam splitting means in a direction parallel to the optical axis of said light source, a reflection optical axis of said first and second total reflection means crossing in an approximately orthogonal manner on the same plane;

third total reflection means, inclined at 45 degrees with respect to a reflection optical axis of said first total reflection means, for totally reflecting the light from said first total reflection means in parallel to surfaces of said first and second total reflection means; and fourth total reflection means, inclined at 45 degrees with respect to a reflection optical axis of said second total reflection means, for totally reflecting the light from said second total reflection means in parallel to surfaces of said first and second total reflection means, in the same direction as that of the light reflected by said third total reflection means, wherein said third and fourth reflection means are disposed adjacent at positions near focal points of a first and a second converging means, in order to make the axes of the polarized reflection light components from said third and fourth total reflection means come close to each other.

10. An apparatus according to claim 9, wherein said second total reflection means converts a polarizing direction of the linearly polarized reflection light component from said polarizing beam splitting means, and said third total reflection means converts a polarizing direction of the linearly polarized reflection light component from said first total reflection means in the same polarizing direction of the linearly polarized reflection light component from said fourth total reflection means.

* * * * *